May 29, 1951 L. M. POTTS 2,554,793

RADIO TELEGRAPH SYSTEM WITH DIRECTION CONTROL

Filed June 11, 1947 7 Sheets-Sheet 1

INVENTOR
LOUIS M. POTTS, DECEASED
MARTHA W. C. POTTS, EXECUTRIX
BY Emery Robinson
ATTORNEY

WEST

INVENTOR
LOUIS M. POTTS, DECEASED
MARTHA W. C. POTTS, EXECUTRIX
BY Emery Robinson
ATTORNEY May 29, 1951 L. M. POTTS 2,554,793

RADIO TELEGRAPH SYSTEM WITH DIRECTION CONTROL

Filed June 11, 1947 7 Sheets-Sheet 3

EAST

INVENTOR
LOUIS M. POTTS, DECEASED
MARTHA W. C. POTTS, EXECUTRIX
BY Emery Robinson
ATTORNEY

RADIO TELEGRAPH SYSTEM WITH DIRECTION CONTROL

Filed June 11, 1947 7 Sheets-Sheet 4

WEST

INVENTOR
LOUIS M. POTTS, DECEASED
MARTHA W. C. POTTS, EXECUTRIX
BY Emery Robinson
ATTORNEY May 29, 1951 L. M. POTTS 2,554,793

RADIO TELEGRAPH SYSTEM WITH DIRECTION CONTROL

Filed June 11, 1947 7 Sheets-Sheet 5

WEST

INVENTOR
LOUIS M. POTTS, DECEASED
MARTHA W. C. POTTS, EXECUTRIX
BY Emery Robinson
ATTORNEY

EAST

INVENTOR
LOUIS M. POTTS, DECEASED
MARTHA W. C. POTTS, EXECUTRIX
BY Emery Robinson
ATTORNEY May 29, 1951 L. M. POTTS 2,554,793

RADIO TELEGRAPH SYSTEM WITH DIRECTION CONTROL

Filed June 11, 1947 7 Sheets-Sheet 7

EAST

INVENTOR
LOUIS M. POTTS, DECEASED
MARTHA W. C. POTTS, EXECUTRIX
BY Emery Robinson
ATTORNEY Patented May 29, 1951 2,554,793

UNITED STATES PATENT OFFICE 2,554,793

RADIO TELEGRAPH SYSTEM WITH DIRECTION CONTROL

Louis M. Potts, deceased, late of Evanston, Ill., by Martha W. C. Potts, executrix, Evanston, Ill., assignor to Teletype Corporation, Chicago, Ill., a corporation of Delaware Application June 11, 1947, Serial No. 754,031

6 Claims. (Cl. 250—8)

This invention relates to telegraph systems and particularly to a system having means for automatically controlling the direction of transmission.

An object of the present invention is to provide in a telegraph system, means for automatically changing the direction of transmission.

A further object of the invention is to provide in a telegraph system having individual stations each equipped with a transmitter, a home record printer and a receiving only printer, direction control means which automatically changes the direction of transmission, disables the transmitter and home record printer of the station about to receive and conditions its receiving only printer for operation and at the same time disables the receiving only printer of the station about to transmit and conditions its transmitter and home record printer for operation.

An additional object of the invention is to provide a telegraph system in which the direction of transmission is automatically reversed after a message has been transmitted.

Other objects and advantages of the invention will appear as the invention is described in detail and restrictions of the scope of the invention should not be implied from the specific recital of the above appearing objects.

The invention has been applied to a two way radio communication system in which radio transmitting and receiving means are located at each of two remote stations. Each station is provided with a comparing means for testing received signals to determine if the received signals are locally generated signals, or signals received from the opposite station. Transmitted signals are inverted so that a continuous wave on signal represents a spacing condition while a continuous wave off signal represents a marking condition. When it is desired to reverse the direction of transmission, the receiving station may send a prolonged break signal which is of a spacing nature. This causes the comparing means at the station which is transmitting to automatically place this station in receiving condition. Each comparing means includes a contact tongue associated with a receiving relay and a contact tongue associated with a testing relay in the transmitting circuit. As long as the signals received by the receiving relay are the same as the signals being received by the testing relay a station may keep transmitting. However, receipt of a break signal by the receiving relay from the opposite station causes a slow to operate relay to become energized by means of the above mentioned contact tongues and to thereby operate a direction control relay at the station which has been transmitting. At the station which has been receiving, transmission of the break signal automatically releases its direction control relay.

A second embodiment of the invention features the use of a home record printer and a receiving only printer at each station. The home record printer is automatically conditioned when a station is about to transmit while the receiving only printer is disabled. At the station which is about to receive the home record printer and transmitter are automatically disabled while the home record printer is conditioned for receipt of the incoming message. Such a system may prove quite advantageous where it is desirable to segregate incoming messages from outgoing messages.

A third embodiment of the invention relates to the use of an alternate direction control which automatically functions at the end of a message to reverse the direction of transmission by sending a break signal to the opposite station.

A better understanding of the present invention may be had by reference to the detailed description which follows when read in conjunction with the drawings wherein.

Figure 1:
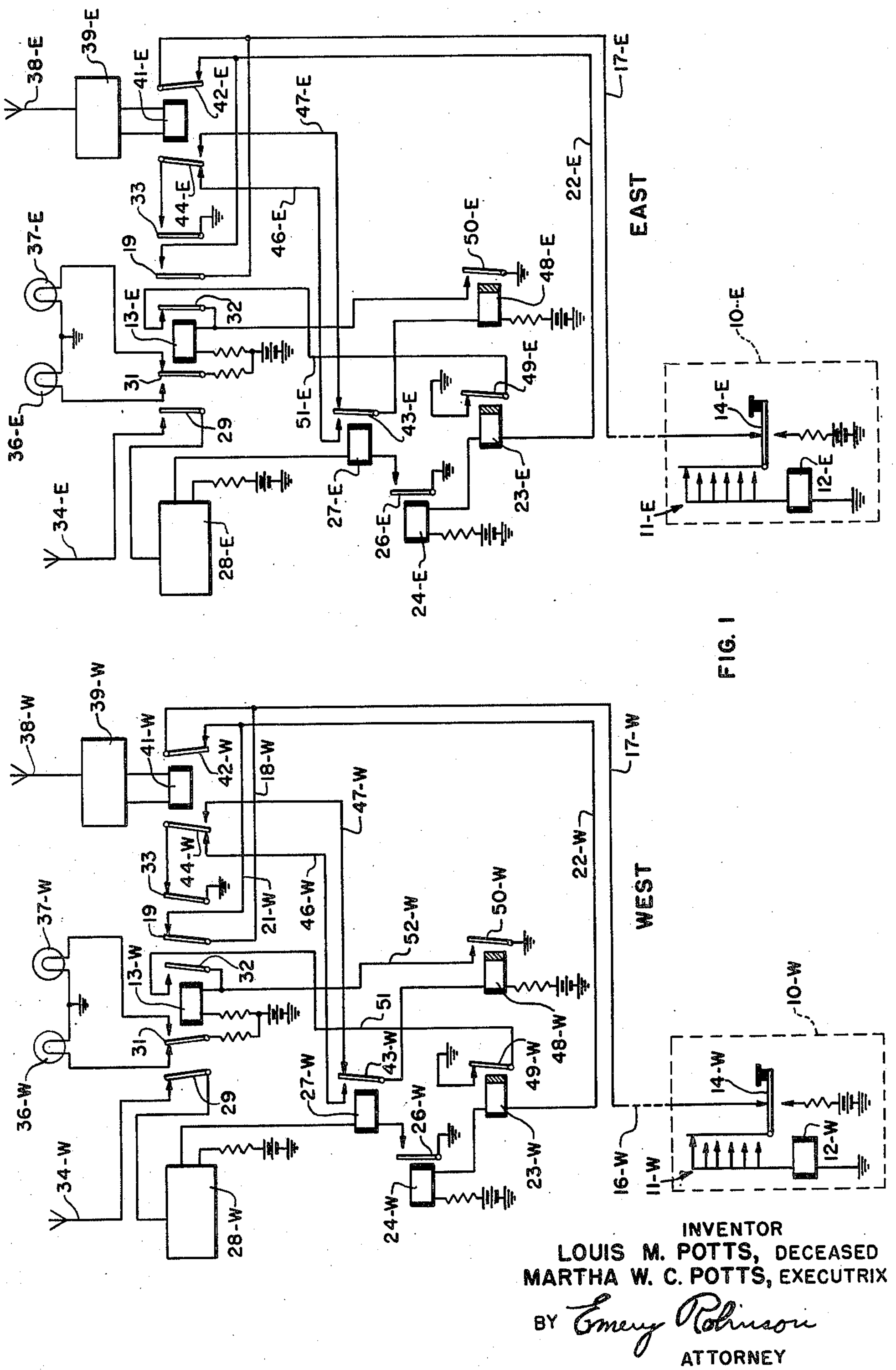
Fig. 1 is a schematic circuit illustration of one embodiment of the invention.

With reference to Fig. 1, the first embodiment of the invention will now be described. At the left side of Fig. 1 is represented a west station, while at the right side of the same figure is represented an identical east station. Hence, it will be noted that in the ensuing description, like parts at each station will be similarly numbered with the alphabetical designation "W" or "E" appended, according to whether or not the part referred to is at the west or east station. It will be understood that duplicate descriptions of what occurs at both the west and east will not be given except where such descriptions may facilitate a better understanding of the invention. Outlying telegraph stations 10W and 10E are shown respectively associated with the west and east stations. However, such outlying stations may, of course, be located at the same site as the station to which each is associated.

Station 10W includes a conventional arrangement of transmitting contacts 11W and a receiver selector magnet 12W. When signals are being transmitted from west to east, a direction control relay 13W is unoperated at the west station while the corresponding relay 13E at the east station is operated. The transmitting circuit for station 10W under these conditions is as follows: From ground, through the winding of selector magnet 12W, through transmitting contacts 11W and a break key 14W, over line 16W and leads 17W, 18W through contact tongue 19 (now closed) of direction control relay 13W, over leads 21W and 22W, through the winding of slow to release relay 23W and through the winding of transmitting relay 24W. It will be noted that the contact tongue 26W of relay 24W in response to a marking condition of relay 24W will move to an open position and in response to a spacing condition will move to a closed position. Thus, the signals are now inverted, causing a testing relay 27W to repeat such inverted signals, for a purpose which will hereafter appear, and also causing radio transmitter 28W to transmit a continuous wave on signal for spacing and a continuous wave off signal for marking.

With direction control relay 13W unoperated, its contact tongues 29, 31, 32, 19 and 33 remain in their unattracted position. With contact tongue 29 against its back contact, an obvious circuit is made for transmitting antenna 34W. With contact tongue 31 on its back contact a circuit is made for signal lamp 36W and with the same contact tongue on its front contact a circuit is made for signal lamp 37W. The signal lamps just described will thus indicate the direction of transmission.

Now as radio signals are transmitted, receiving antenna 38E at the east station receives the signals for radio receiver 39E to accordingly operate receiving relay 41E. Thus, operation of contact tongue 42E of receiving relay 41E opens and closes the circuit extending over leads 22E and 17E to receiving selector magnet 12E as was described in connection with the west station. It will be noted that signals received by receiving relay 41E are now reinverted back to their normal condition since in response to a carrier wave on condition, which is spacing, it causes opening of contact tongue 42E and in response to a carrier wave off condition, which is marking, it causes closure of contact tongue 42E.

Signals transmitted by the west station are also received by the west station antenna 38W and similarly cause operation of receiving relay 41W and contact tongue 42W. However, operation of contact tongue 42W does not cause echo signals to be impressed on receiving selector magnet 12W since leads 22W and 17W are held closed with contact tongue 19 of direction control relay 13W in its unattracted position as was initially described above. However, at the east station contact tongue 19 of relay 13E is in its open position due to the energization of direction control relay 13E.

As testing relay 27W responds to the outgoing signals, its contact tongue 43W moves between its front and back contacts and, at the same time, contact tongue 44W of receiving relay 41W also moves between its front and back contacts as the outgoing signals are locally received. When a spacing signal is received by relay 27W, its contact tongue 43W will be attracted while at the same time contact tongue 44W is attracted by receiving relay 41W. When marking signals are being transmitted an opposite condition is effected. Hence, as long as the signals received by receiving relay 41W are local signals, a circuit cannot be completed over leads 46W or 27W for slow to operate relay 48W from grounded contact tongue 33W of direction control relay 13W. Circuit closures for a very slight length of time due to lag in contact tongue operation between relays 41W and 27W are insufficient to operate the slow to operate relay 48W.

If it is now assumed that the east station desires to interrupt transmission from the west station, break key 14E is operated which releases relay 23E to break a locking circuit for direction control relay 13E, extending through contact tongue 49E of slow to release relay 23E, over lead 51E and through contact tongue 32 of direction control relay 13E. Thus, as direction control relay 13E releases, the antenna 34E is connected due to closure of contact tongue 29, lamp 36E is illuminated by operation of contact tongue 31 and lamp 37E is extinguished. The transmitting circuit extending over leads 17E and 22E is now placed in operating condition as contact tongue 19 falls away. Now, when the steady spacing signal is received at the west station, receiving relay 41W will remain steadily energized, upsetting the testing operation of contact tongue 43W of relay 27W and contact tongue 44W of receiving relay 41W. In other words, as soon as the first marking impulse is received by testing relay 27W after the steady operation of receiving relay 41W, slow to operate relay 48W will now operate and complete a circuit extending through contact tongue 50W and over lead 52W for direction control relay 13W, which now locks up through contact tongue 49W of slow to release relay 23W. It is understood, that relay 23W will be retained operated as normal signals containing marking impulses pass therethrough and will only de-energize when a steady spacing signal is received. Thus, with direction control relay 13W energized and direction control relay 13E de-energized, transmission may now take place from station 10E to station 10W.

Figure 2:
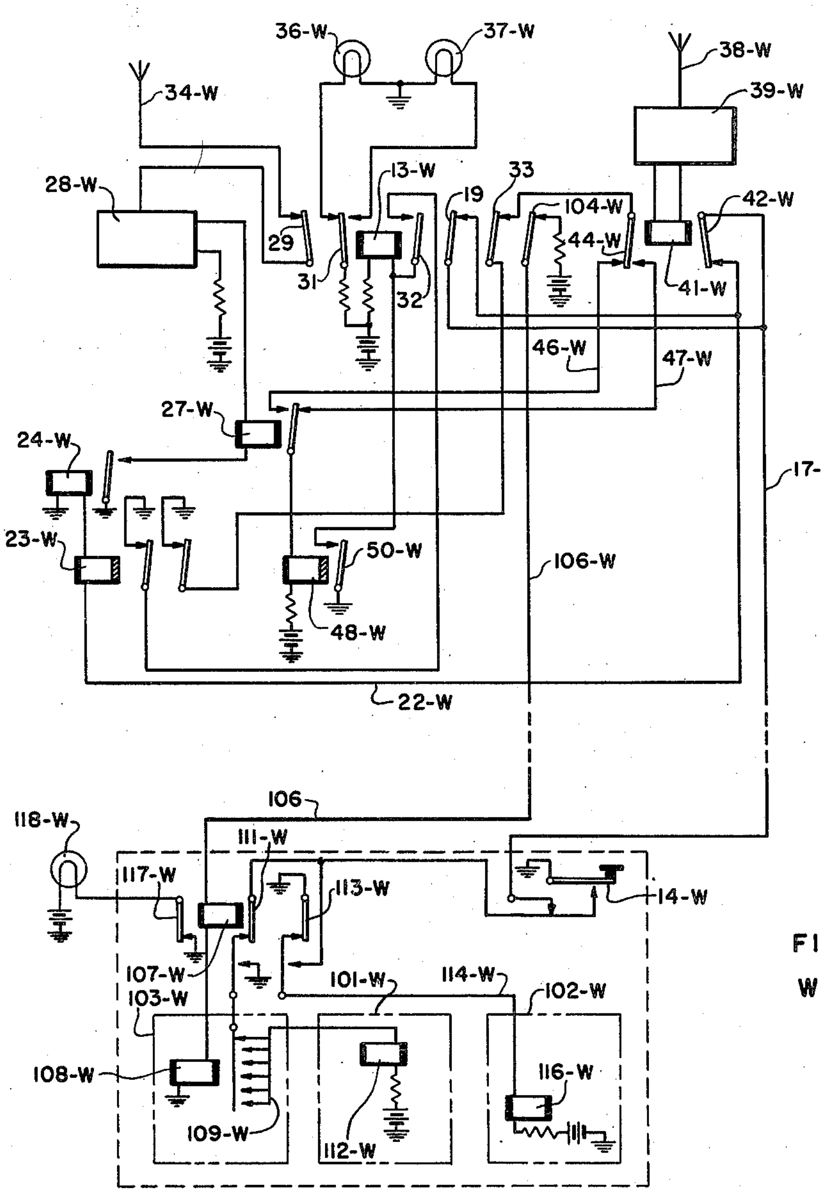
Figs. 2 and 3 represent a schematic circuit illustration of a second embodiment of the invention.
Figure 3:
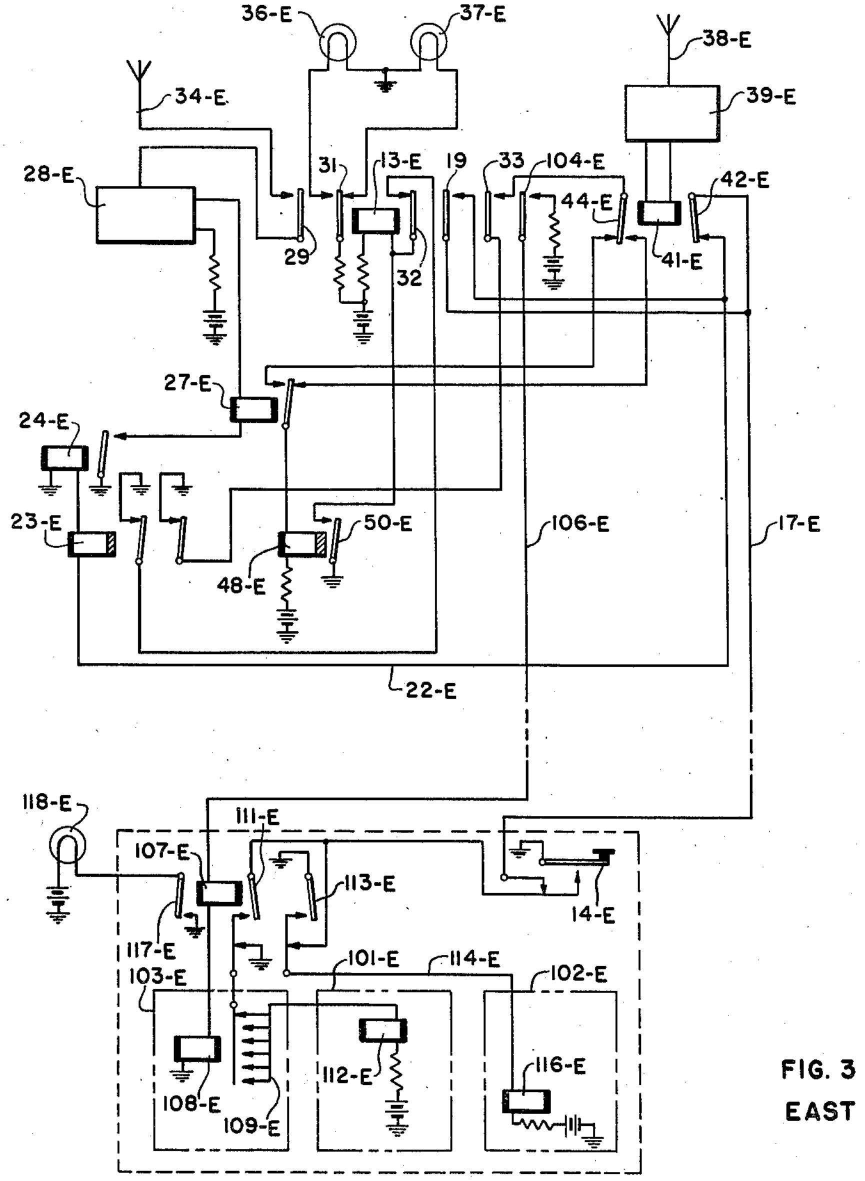
Figure 4:
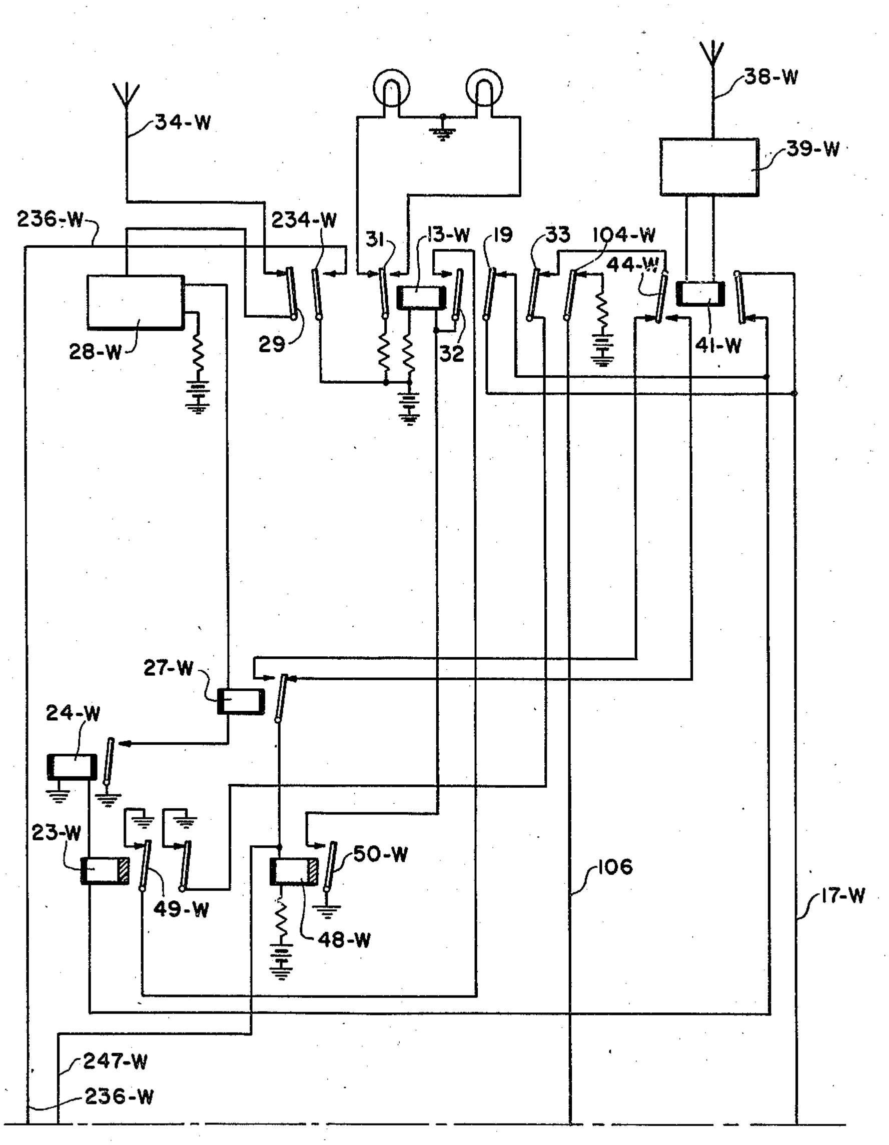
Figs. 4 to 7, inclusive, represent a schematic circuit illustration of a third embodiment of the invention.

With reference to Figs. 2 and 3 the second embodiment of the invention will now be described. Description of the first embodiment of the invention will not be duplicated except where necessary for a full understanding of the invention. A feature of this embodiment of the invention is the use of home record printers 101W, 101E and receiving only printers 102W, 102E in conjunction with transmitters 103W, 103E.

Operable under the control of direction relay 13W, is a newly added contact tongue 104W which in its unattracted position completes an obvious circuit extending over lead 106W for relay 107W and a transmitter start magnet 108W. With relay 107W operated, transmitting contacts 109W are in the transmitting circuit extending through make before break contact tongue 111W and through break key 14W to lead 17W as in the first embodiment of the invention. It will be noted that the transmitting contacts 109W are in series with selector magnet 112W of home record printer 101W when contact tongue 111W of relay 107W is in its attracted position. Closure of make before break contact tongue 113W by operation of relay 107W maintains a marking condition over lead 114W for selector magnet 116W of receiving only printer 102W when transmitter 103W is sending signals to the receiving only printer 102E at the east station. It will, of course, be understood that whatever is described at the west station will be the same as similarly numbered parts at the east station.

The break signal is transmitted exactly as was described in the first embodiment of the invention. Let it now be assumed that the west station is transmitting signals to the east station and that the latter station wishes to interrupt transmission to send a message from east to west. Transmission of the break signal from the east station by operation of key 14E will cause the release of direction control relay 13E at the east station and operation of direction control relay 13W at the west station. Closure of contact tongue 104E due to the release of relay 134 causes relay 107E and start magnet 108E of transmitter 103E to operate. This places transmitter 103E in condition to send signals over lead 17E as was described in connection with the west station. As relay 107W releases due to the opening of contact tongue 104W of relay 13W, contact tongue 111W moves to its unattracted position, and an obvious circuit is closed extending through transmitting contacts 109W and selector magnet 112W, placing a steady marking condition on selector magnet 112W and preventing the operation of home recorder 101W. As contact tongue 113W similarly moves to its unattracted position, receiving only printer 102W is placed in receiving condition since a circuit now extends from lead 17W, through break key 14W, through contact tongue 113W, and over lead 114W to the selector magnet 116W of the receiving only printer 102W. Release of contact tongue 117W by relay 107W causes a signal lamp 118W to be extinguished, while operation of contact tongue 117E by relay 107E causes signal lamp 118E to be illuminated. These signal lamps give a ready indication of the direction of transmission. It will be observed that operation of break key 14E causes a steady marking current to be impressed on selector magnet 116E until relay 107E has a chance to operate and provide the steady marking current through contact tongue 113E.

Figure 5:
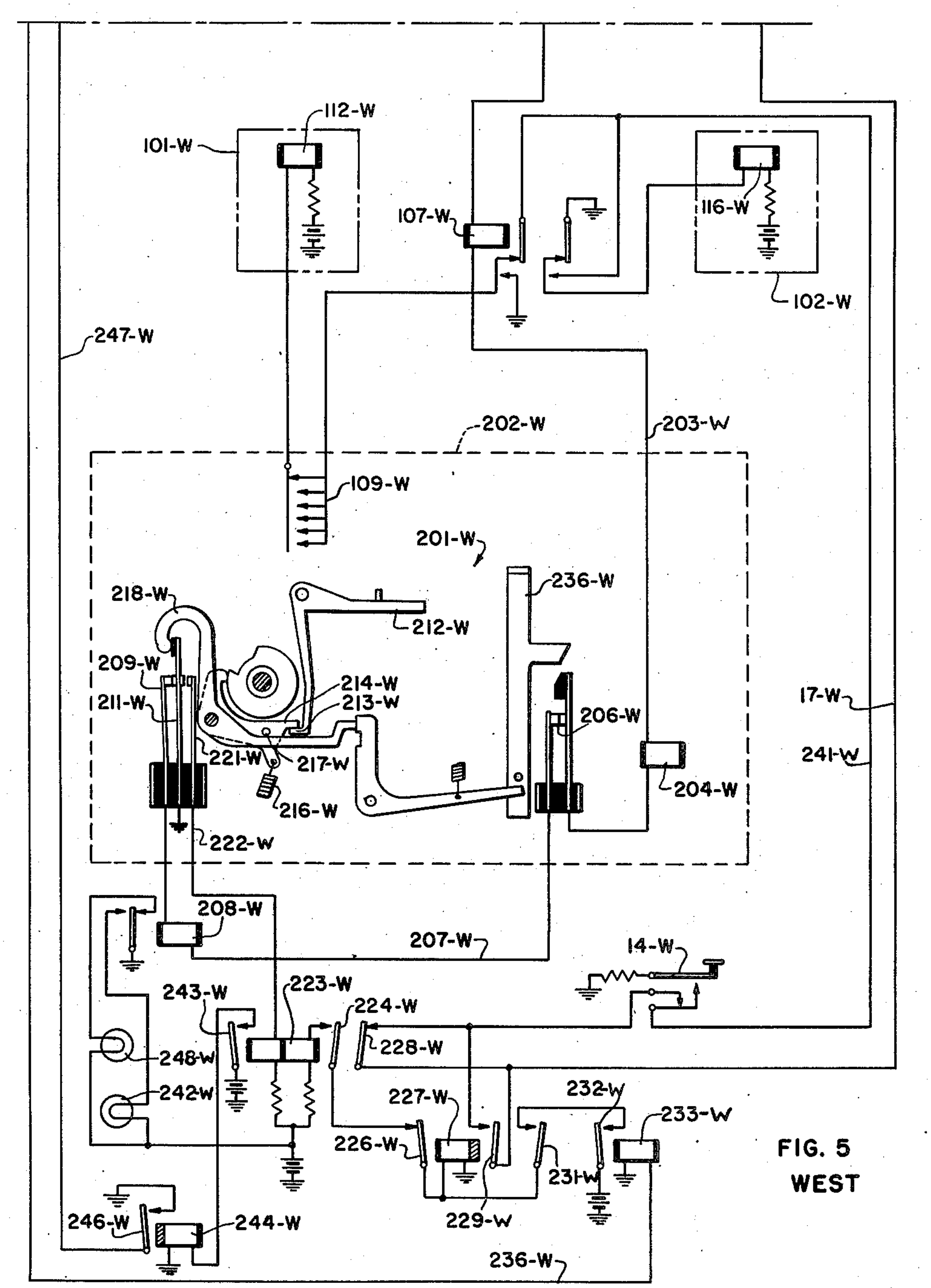
Figure 6:
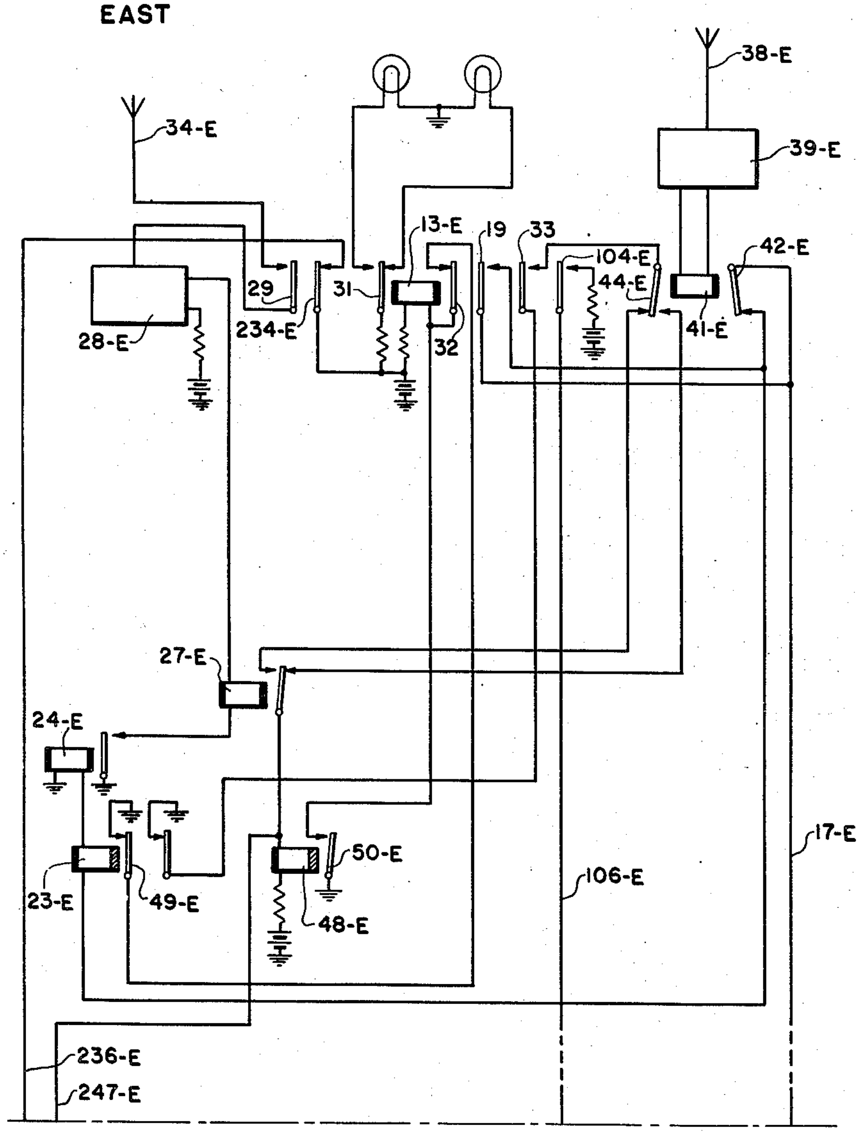
Figure 7:
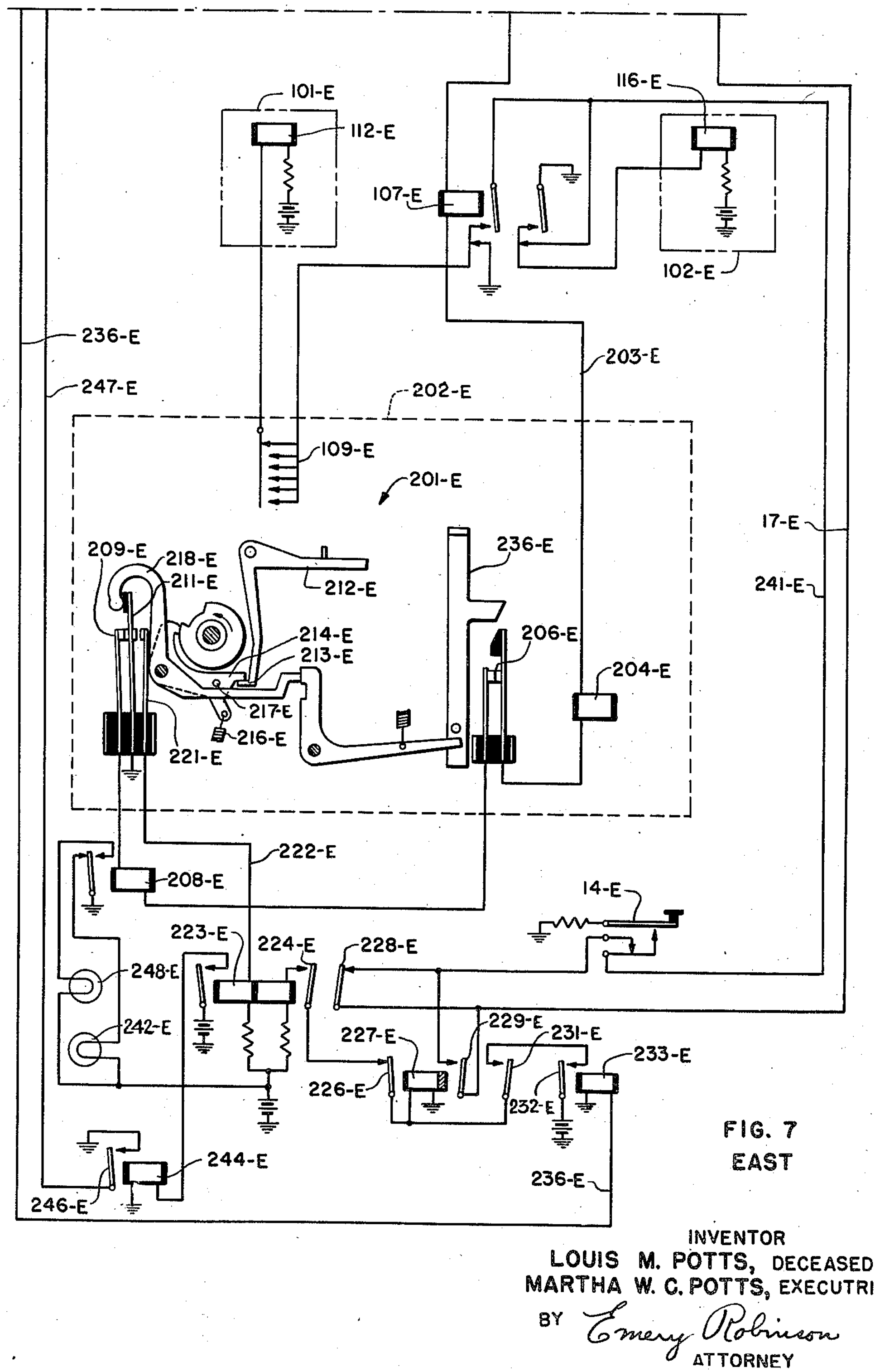

A third embodiment of the invention disclosed in Figs. 4, 5, 6, and 7 will now be described. This form of the invention features the use of alternate direction control means whereby an automatic break signal is transmitted by a station at the end of a message to automatically reverse the direction of transmission. For accomplishing such automatic reversal, an end of message responsive mechanism such as is disclosed in the patent of Goetz, No. 2,296,845 and indicated generally by numerals 201W and 201E is employed. The end of message responsive mechanisms form a part of their respective transmitters 202W and 202E. At the west station, the circuit extending from contact tongue 104W of direction control relay 13W over lead 106 now proceeds through relay 107W, over lead 203W, through transmitter start magnet 204W, through contact pair 206W, over lead 207W, through the winding of relay 208W, and through contact blades 209W and 211W to ground. It is assumed that the west station is now transmitting to the east station and that the various parts are conditioned as shown in Fig. 5.

When the end of a message is reached, an end of message feeler 212W pivots counterclockwise withdrawing its shoulder 213W from beneath latch 214W, which now pivots clockwise under impetus of spring 216W. By means of pin 217W carried by latch 214W, gooseneck lever 218W is caused to pivot clockwise, opening contact blades 209W, 211W and closing blades 211W and 221W. Thus the circuit for start magnet 204W is broken and transmitter 202W comes to rest. Closure of contact blades 211W, 221W, provides a circuit over lead 222W for the left-hand winding of double wound relay 223W. Relay 223W now locks up through its contact tongue 224W, contact tongue 226W of slow to operate relay 227W and through the winding of the last mentioned relay. As contact tongue 228W is attracted, the transmitting circuit extending over leads 241W through break key 14W and over lead 17W is broken sending a steady spacing signal to the east station. After a short predetermined interval, slow to operate relay 227W operates, opening contact tongue 226W and breaking the locking circuit for relay 223W. At the same time contact tongues 229W and 231W are attracted by relay 227W. Closure of contact tongue 229W, closes the line circuit extending over lead 17W and thereby terminates the break signal. A locking circuit is now maintained for relay 227W which extends through its contact tongue 231W and tongue 232W of relay 233W (now operated). Relay 233W is at this time operated over the following circuit: From newly added contact tongue 234W of direction control relay 13W (now operated) over lead 236W and through the winding of relay 233W. It is apparent that when the direction of transmission again changes, relay 13W will be released, the just described circuit for relay 233W will be broken, and relay 227W will be released.

As relay 223W attracts contact tongue 243W a circuit is completed to slow to operate relay 244W. After antenna 34W has functioned to transmit the break signal to the east station, relay 244W operates and establishes a circuit through its contact tongue 246W and over lead 247W for the winding of slow to operate relay 48W. As relay 48W operates, it closes contact tongue 50W which operates direction control relay 13W as described in the first embodiment of the invention.

When the break signal is received at the east station, direction control relay 13E is de-energized as relay 23E becomes de-energized and breaks the locking circuit for relay 13E extending through tongue 49E. It will be understood that an operator will manipulate bar 236W after the end of a message is reached to close contact blades 209W, 211W and insert a new message tape, so that when the east station completes transmission of a message, the direction of transmission will again be reversed so that the west station transmits to the east station. Opening of contact blades 209W, 211W causes relays 223W and 244W to release. For a more complete description of the operation of the end of the message device 201W, reference should be had to the aforementioned Goetz patent. The direction of transmission may also be reversed by operation of break keys 14W, 14E in the manner described in the second embodiment of the invention. When relay 208W is operated, signal lamp 248W is illuminated and when the same relay is released signal lamp 242W is illuminated.

It must be understood that various changes and modifications may be made in the present invention without departing from the spirit or scope thereof and that in some instances the system may be successfully used in wired systems as well as in radio systems. The invention should therefore not be limited in scope except as defined by the appended claims.

What is claimed is:

1. A telegraph system including a transmission path, a first and second station associated with said path, a transmitter, a home recorder and a receiving only recorder at each of said stations, testing means including means responsive to outgoing and incoming signals at each of said stations for testing received signals to determine if the received signals are locally generated signals or signals received from the opposite station, means at each of said stations associated with said testing means and responsive to the receipt of signals from the opposite station for thereby automatically disabling said transmitter and home recorder and conditioning said receiving only recorder at the station receiving said signals, and means at said opposite station for disabling said receiving only printer and conditioning said transmitter and home recorder upon transmission of said signals.

2. A telegraph system including a first and second station, a transmitter, a home recorder and a receiving only recorder at each of said stations, an end-of-message responsive mechanism at each of said stations, break signal transmitting means at each of said stations, said end-of-message responsive mechanism being operable at the termination of each message to operate said break signal transmitting means to send a break signal to the opposite station, means at each station responsive to the receipt of said break signal for automatically disabling the receiving only recorder and conditioning the transmitter and home recorder thereat, and means at each station operable upon transmission of said break signal therefrom for automatically disabling the transmitter and home recorder thereat and conditioning the receiving only recorder for reception of signals from the opposite station.

3. A radio telegraph system including a first and second station, radio transmitting means at each of said stations for transmitting signals, radio receiving means at each of said stations for receiving signals, testing means at each of said stations including a first relay for testing incoming and outgoing signals and a second relay for testing outgoing signals, said second relay cooperating with said first relay for determining if the signals are locally generated signals or signals received from the opposite station, and means at each of said stations associated with said testing means and responsive to a prolonged signal of one nature received from the opposite one of said stations for automatically enabling said opposite station to gain control of the direction of transmission.

4. A telegraph system including a transmission path, a first and second station associated with said path, transmitting and receiving devices at each of said stations for transmitting intelligence between said stations, testing means including means responsive to incoming and outgoing signals and means responsive only to outgoing signals for determining if the received signals are locally generated signals or signals received from the opposite station, and means at each of said stations associated with said testing means and responsive to the receipt of signals from the opposite station for enabling said opposite station to gain control of the direction of transmission.

5. A radio telegraph system including a first and second station, radio transmitting means at each of said stations for transmitting signals, radio receiving means at each of said stations for receiving signals, testing means at each of said stations for testing signals received at each station to determine if the received signals are locally generated signals or signals received from the opposite station, and means at each of said stations associated with said testing means and responsive to a prolonged signal of one nature received from the opposite one of said stations for automatically enabling said opposite station to gain control of the direction of transmission.

6. A radio telegraph system including a first and second station, a transmitter, a home record recorder and a receiving only recorder at each of said stations, radio transmitting means at each station for transmitting signals, radio receiving means at each station for receiving signals, testing means at each of said stations for testing signals received at each station to determine if the received signals are locally generated signals or signals received from the opposite station, means at each of said stations for transmitting a prolonged signal of one nature and for thereby conditioning the transmitter and home recorder and disabling the receiving only recorder at the station transmitting said prolonged signal, and means at each of said stations associated with said testing means and responsive to the receipt of said prolonged signal from the opposite station for automatically disabling said transmitter and said home record recorder and conditioning said receiving only printer for operation at the station receiving said prolonged signal.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
|---|---|---|
| 1,673,445 | Dudley | June 12, 1928 |
| 1,904,618 | Burton | Apr. 18, 1933 |
| 2,242,196 | Thompson et al. | May 13, 1941 |
| 2,269,986 | Potts | Jan. 13, 1942 |
| 2,281,745 | Buckingham | May 5, 1942 |
| 2,363,583 | Gilman | Nov. 28, 1944 |
| 2,407,846 | O'Brien | Sept. 17, 1946 |